United States Patent Office 2,699,080
Patented Jan. 11, 1955

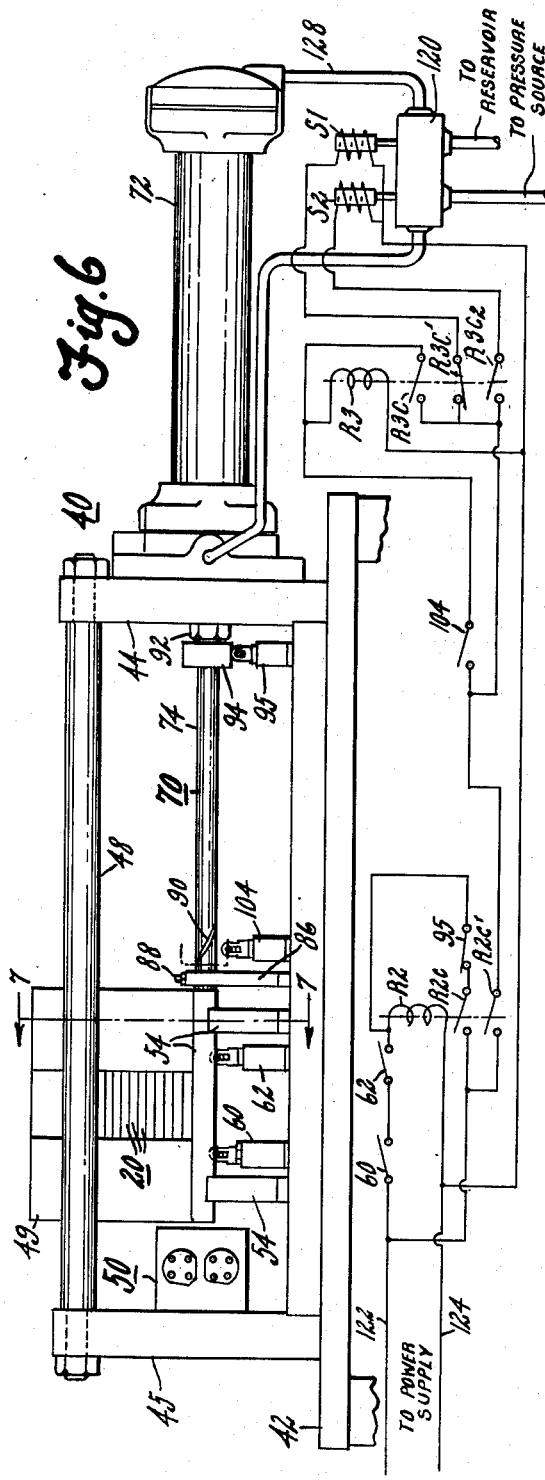

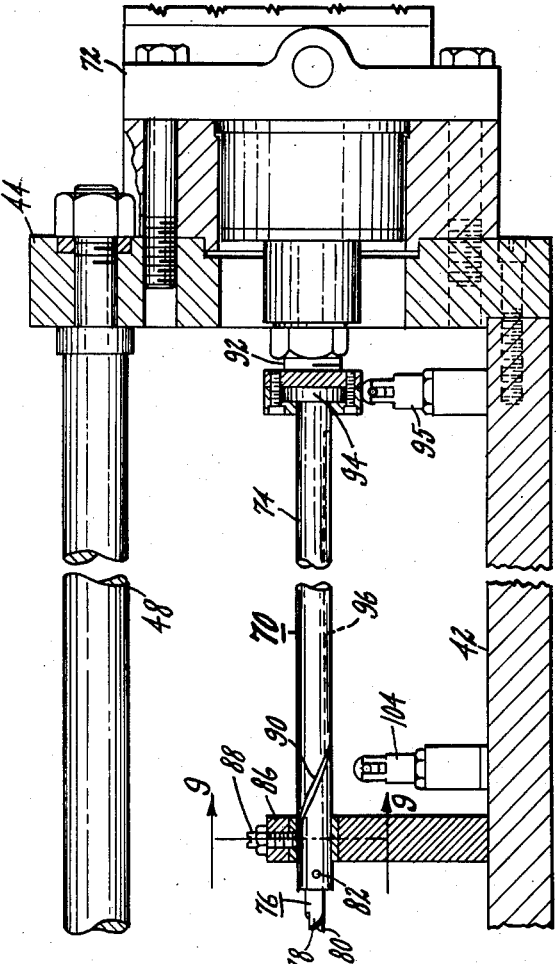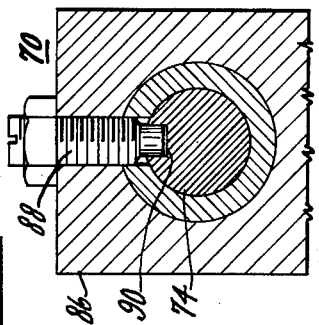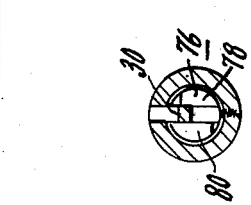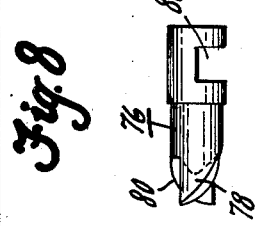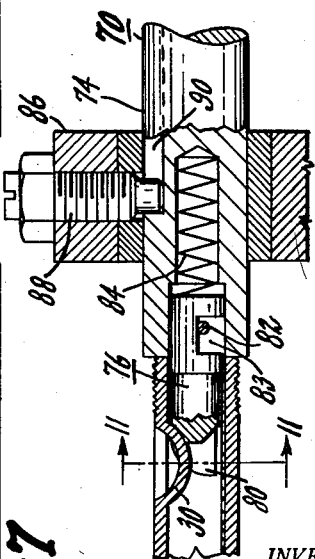
INVENTORS
CHARLES A. NICHOLS
GEORGE L. WEISER
BY
THEIR ATTORNEYS

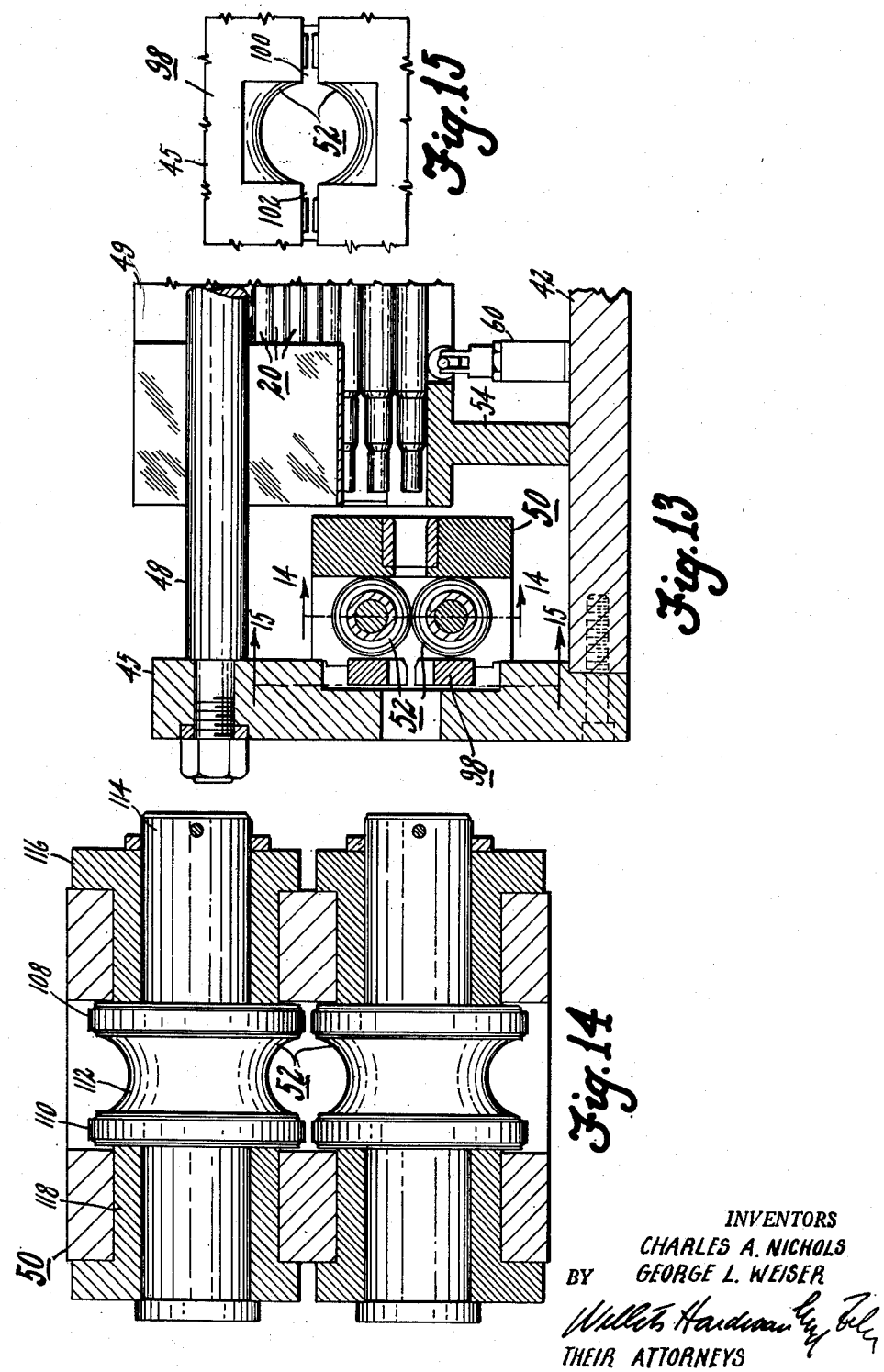

2,699,080

APPARATUS FOR FORMING SPLINES ON TUBULAR SHAFTS

Charles A. Nichols, Anderson, and George L. Weiser, Middletown, Ind., assignors to General Motors Corporation, Detroit, Mich., a corporation of Delaware Application November 14, 1951, Serial No. 256,332

4 Claims. (Cl. 80—1)

This invention relates to a method and apparatus for forming splines on tubular shafts and the like.

The invention is particularly directed to forming splines of tubular shafts made from seamed or welded tubing wherein the spline is positioned on either side of the tube and is oriented 90° from the seam or welded butt joint thereof. It is, therefore, a main object of the invention to provide a method and apparatus for forming splines on seamed tubing, such as butt welded tubing, wherein the spline is oriented 90° from the seam so that there is no opportunity to split the tube or otherwise damage the tube.

In carrying out this object it is a further object to provide a method and apparatus for orienting the tube so that the shaft is properly positioned at the time the shaft is splined.

Another object of the invention is to provide a method and apparatus for splining tubes wherein carboloy edged embossing rolls are used as a means for producing the spline or splines on tubing.

A still further object of the invention is to provide a method and apparatus which is automatically controlled for orienting and subsequent embossing of the tube through electrical circuits which maintain the apparatus and process fully automatic.

A still further object of the invention is to provide a method and apparatus for making armature shafts from hollow tubing of the seamed variety wherein the tubing includes a keyway which is used as a means for properly orienting the tube and wherein the splined portions thereof are always oriented 90° from the seam. In carrying out this object it is a still further object to provide a two-toothed ram which fits into the bore of the tube and which is rotated through a movement of 180° while simultaneously being moved laterally a distance greater than the length of the shaft to be splined whereby the two-toothed end of the ram engages the keyway which is always positioned 180° from the seam, turns the tube while simultaneously advancing it toward the embossing rolls 180° whereby the tube is properly oriented at the point of entrance between the rolls and finally causes complete passage of the tube through the rolls for embossing the tube on opposed external sides thereof at points 90° from the seam.

While the embodiment of the present invention as herein disclosed constitutes a preferred form, it is to be understood that other forms might be adopted.

In the drawings:

Fig. 1 is a perspective view of an armature shaft to be operated upon;

Fig. 2 is a view of the splined shaft in completed condition;

Fig. 3 is a view taken on line 3—3 of Fig. 1;

Fig. 4 is a section taken on line 4—4 of Fig. 3 showing the keyway with reference to the seam;

Fig. 5 is a sectional view taken on line 5—5 of Fig. 2 showing the splines with reference to the seam;

Fig. 6 is a side view of the apparatus used to spline the shafts and includes a diagrammatic showing of the electrical and hydraulic control systems for operating the machine;

Fig. 7 is a sectional view taken on line 7—7 of Fig. 6;

Fig. 8 is a sectional view of the ram portion of the apparatus;

Fig. 9 is a sectional view taken on line 9—9 of Fig. 8;

Fig. 10 is an enlarged fragmentary sectional view showing the end of the ram engaging the end of a shaft;

Fig. 11 is a sectional view taken on line 11—11 of Fig. 10;

Fig. 12 is a view of the toothed end portion of the ram used for engaging the keyway;

Fig. 13 is a fragmentary end view in section showing the embossing rolls and guides therefor;

Fig. 14 is a sectional view taken on line 14—14 of Fig. 13 showing an enlarged section of the rolls with the mounting in cross-section;

Fig. 15 is an enlarged view taken on line 15—15 of Fig. 13 showing the end guides on the exit side of the rolls.

The use of tubular shafts for motor or generator assemblies is highly desirable providing said shafts can be properly contoured and accurately dimensioned. In copending application of William Fletcher, Serial No. 243,060, filed August 22, 1951, the manufacture of a contoured shaft is shown wherein the contoured shaft is swaged inwardly adjacent the ends thereof to form accurate bearing portions which require no further machining. This shaft is made from seamed and welded tubing and therefore provides a light-weight and inexpensive shaft which has all of the desirable characteristics of a solid steel shaft but which may be manufactured in a relatively short time and at a reduced cost since the usual machining and grinding operations are eliminated. Shafts such as are formed by practicing the methods of said Fletcher application are next operated upon to provide a keyway therein, which is substantially a half-moon shaped depression into the shaft in a position oriented exactly 180° from the weld joint. This keyway and its position are clearly shown in Figs. 3 and 4 of the drawings herein.

Keyed shafts of this character are necessarily splined in order to provide substantial mounting for the laminations of the armature assembly wherein each lamination is forced over the splines progressively to cause the splines to cut into the lamination and thereby firmly hold it against relative rotation.

An unsplined shaft is shown at 20, Fig. 1. This shaft is the type of shaft to be operated upon by the method and apparatus as disclosed herein. It includes reduced diameter portions 22, 24, and 26 and the portion 22 being preferably threaded at its outer end 28. The reduced diameter portion 22 also includes a keyway 30 which is formed in a half-moon shape by depressing the material at this point. It will be noted, with reference to Fig. 4 that the keyway 30 is oriented exactly 180° from the welded seam 32. This position of the keyway is important in the subsequent orientation of the shaft prior to the splining operation. A completely formed shaft is shown in Fig. 2 wherein a spline 34 is provided at each of the opposite sides of the tube as noted in Fig. 5, which splines are longitudinally embossed out of the surface of the tube and, as will be noted, are positioned exactly 90° removed from the seam 32. This positioning is necessary since if the tubing or shaft 20 is not properly orientated and one of the splines were to be cut adjacent the seam 32, there is a possibility of a poor spline, etc. Further, by splining the tube on opposite sides, 90° removed from the seam, the pressures are equalized one against the other and the seam itself is compressed towards closed position whereby no strains are apparent on the weld.

In practicing the method, an apparatus 40 is used as shown in Fig. 6. The apparatus includes a base plate 42, the end bolsters 44 and 45 fastened to the base plate 42 and maintained in position by strain bars 48. An embossing fixture 50 is mounted on bolster 45 and includes a pair of embossing rolls 52 which are of identical design. The features of these rolls will be described hereinafter. Also mounted on the base plate 42 is a grooved receptacle 54 to support a shaft at the enlarged diameter portion thereof. The receptacle has a channel-shaped top portion which holds the shafts aligned therein. A supply of shafts 20 is maintained in a magazine 49 which opens outwardly through an integral chute onto the receptacle 54 which, due to its top channels, receive only one shaft at a time. After a shaft 20 has been removed from the receptacle another shaft may fall into place.

A pair of micro switches 60 and 62 are provided beneath the receptacle 54 and are so positioned that when a shaft is in place on the receptacle, the micro switches are actuated by the shaft to closed position. The particular positioning of these switches is shown in part in Fig. 13.

After the shaft 20 is positioned on receptacle 54, a ram 70 is actuated by an hydraulic device 72. The ram 70 is in its rear position, as shown in Figs. 6 and 8, and consists of an elongated rod 74 having a two-toothed end portion 76 as shown in detail in Fig. 12. The two teeth 78 and 80 are spaced apart, as shown in Fig. 11, so as to permit the key 30 to fit therebetween when the end of the ram 76 is in position. This end portion 76 is fitted in the outer extremity of the ram rod 74 and held therein by a pin 82 fitted into a notch 83. The end portion 76 is backed up by a spring 84 which permits slight longitudinal movement thereof as limited by the extent of the notch 83 so that the teeth may "feel" their way into nesting position with the keyway 30. The ram 70 passes through a guide-post 86 which includes a pin 88 therein that rides in a groove 90 in the ram rod 74. A portion of the groove 90 extends 180° around the rod 74 and is of a pitch so that the rod can move an appreciable distance before the 180° turn is made. The hydraulic device 72 actuates the ram 70 through a piston 92, which is connected to the ram rod 74 by a rotatable thrust connection collar 94 so that as the ram rod 74 is being advanced longitudinally it may turn against the thrust surface in the collar 94. This collar 94 is also used to actuate micro switch 95, to be described hereinafter.

In operation, after the shaft 20 is positioned on receptacle 54, the hydraulic device 72 causes the ram 70 to advance toward the left. As this occurs, the rod 74 is turned slightly and the ram end 76, which is aligned with the end of the shaft 20, enters the shaft bore as the rod turns until such time as the teeth 78 and 80 engage the key 30 therebetween and turn the shaft until it is properly oriented. As noted, the shock absorbing connection between the end 76 and the rod 74 permits this to occur rather easily. After orientation of the shaft is completed, the ram ceases to turn since the groove 90 runs axially of the shaft the remainder of the length thereof as noted at 96. This causes the shaft 20 to be pushed or forced longitudinally into the embossing fixture 50 wherein it is splined by a pair of embossing rolls 52.

At the other side of the fixture 50 is a guide 98, noted in Fig. 15, which has grooves 100 and 102 therein so dimensioned as to guide the splines of the shaft outwardly into a supply collector.

When the ram 70 is at the outward end of its movement, the collar 94 engages a micro switch 104 which closes a circuit to a hydraulic control device to reverse the movement of the ram to its initial position whereupon another shaft from the hopper 49 can drop upon the receptacle 54 closing the circuits through micro switches 60 and 62 to reestablish forward movement of the ram 70 whereby the cycle is reinitiated.

The rolls 52 are identical and are made up of three parts, namely, two carboloy edges 108 and 110 and a central portion 112. These are assembled upon shafts 114 which are journalled in bearings 116 and 118 carried by the receptacle 50. The edge portions 108 and 110 are tightly engaged to the central grooved portions 112 and these edge portions are preferably made of carboloy to act upon the tubing of the shaft 20. Both rolls 52 are identical and the parts thereof are interchangeable. When the edges 108 and 110 become dulled or worn, they may be replaced. It will be noted that the grooved portions 112 of rolls 52 form a circular relief therethrough which is preferably of slightly less diameter than the diameter of the shaft. This compresses the shaft slightly while the edge portions bite into the shaft and actually emboss the splines longitudinally thereof. A cross-section of a finished shaft is noted in Fig. 5. At no time is there sufficient compression on the shaft to in any way injure the welded seam and the only motive power to force the shaft through the embossing rolls 52 is supplied by the ram 70.

In Fig. 5, it will be seen that the seam 32 is 90° removed from the splines 34. This is always the case since the ram rod 74 with its two toothed end portions 76 always turns the shaft to this position. As previously mentioned, the key 30 is always formed 180° from the seam. Since the ram rod 74 is always turned 180° while engaging the shaft 20 wherein the toothed portions at the ram end 76 engaged with the key 30, the shaft 20 is always oriented prior to entry through the embossing rolls 52 so that the weld is in the proper position. In this connection, it will be noted that the distance between the end of a shaft as it comes from the magazine and the entrance to the embossing rolls is slightly greater than the length of the pitched portion of slot 90 so that the shaft 20 is fully oriented before it actually enters the embossing rolls.

The hydraulic and electric control system for the device is seen in Fig. 6, wherein a dual control valve 120 actuates the hydraulic cylinder 72 which is a double-acting type wherein pressure may be applied at either end in accordance with the position of valve 120 and wherein the other end always is open to the reservoir of the hydraulic supply.

The electrical control system used is shown in connection with the apparatus in Fig. 6. The system consists of micro switches 60, 62, 95 and 104. Switches 60 and 62 are normally open and are closed only when a shaft is in position on the receptacle 54 or during the time that the ram 70 is directly thereover. Switch 104 is normally open until the ram 70 reaches its limit of movement toward the left whereupon the switch is closed by collar 94 and remains closed until collar 94 is backed off. Switch 95 is normally closed except when the ram 70 is in its extreme backward position. Therefore, describing the operation of the circuit as shown in its normal starting position in Fig. 6, power is supplied through power supply lines 122 and 124. As soon as a shaft 20 drops in place on receptacle 54, the switches 60 and 62 are closed. The use of the two switches is occasioned by the fact that, if the shaft 20 is cocked or misaligned on the receptacle 54, the circuit will not be closed. However, if the shaft 20 is properly positioned, both switches 60 and 62 are closed to complete a circuit through the coil R2 of a relay contactor. Energization of coil R2 causes the switch contacts of the relays R2c and R2c' to close. Closure of relay contacts R2c conditions a holding circuit for coil R2 through switch 95 which closes shortly after start of the cycle. Closure of contacts R2c' completes a circuit through normally closed contacts R3c' of a second relay coil R3 to energize solenoid winding S1 of the control device 120. This initiates operation of the hydraulic cylinder 72 by admitting fluid under pressure through conduit 128. Actuation of the hydraulic cylinder 72 causes the ram 70 to move toward the left. Thus causes collar 94 to move away from switch 95 to permit it to close and complete the holding circuit for coil R2.

When the ram 70 reaches its extreme left position, collar 94 closes switch 104 to complete the circuit through relay coil R3. This causes normally open relay contacts R3c and R3c2 to close and causes normally closed contacts R3c' to open. Opening of contacts R3c' breaks the circuit through solenoid S1. Simultaneously, closure of contacts R3c2 completes the circuit through solenoid S2 to reverse the flow of hydraulic fluid through cylinder 72 thereby reversing movement of the ram 70. Closure of contacts R3c completes a holding circuit for relay coil R3. Thus, the ram 70 is now being moved backwards, or to the right. Switch 104 is immediately opened as collar 94 is backed away but the relay coil R3 remains energized through its holding circuit. The ram 70 continues to be moved to the right until collar 94 engages switch 95 to open the same. This breaks the holding circuit through relay coil R2 to cause contacts R2c' to open and de-energize relay coil R3 by breaking its holding circuit. In this position the entire system is stopped since neither solenoid S1 or S2 is energized. Immediately upon the feeding of another shaft 20 onto receptacle 54 the switches 60 and 62 are closed to re-initiate the cycle by energizing solenoid S1. As soon as the ram 70 starts to move towards the left, collar 94 is moved out of contact with switch 95 to permit it to close for completing the holding circuit for relay coil R2. The remainder of the cycle is the same as previously described.

It is apparent that various modifications of the apparatus may be made to suit specific purposes. For example, instead of a keyway, any other suitable indexing point may be provided, such as an aperture, protuberance or groove, etc. Also, the angle through which the shaft is rotated may be changed in accordance with the device being processed by varying the curved portion of the ram slot.

In the present embodiment this portion of the slot rotates the ram 180° but it is obvious that more or less rotation may be obtained if desired or required. Similarly, instead of a hydraulic operating cylinder for the ram, mechanical means may be used as operated through suitable gearing, etc., all of these modifications being apparent to persons skilled in the art.

While the embodiment of the present invention as herein disclosed constitutes a preferred form, it is to be understood that other forms might be adapted.

What is claimed is as follows:

1. A machine adapted for producing a longitudinal spline on a tube 90° from a keyway therein positioned adjacent one end thereof, comprising; a receptacle adapted to receive a tube having a keyway therein, a rotatable and longitudinally movable ram having a toothed end portion adapted to engage said keyway for imparting rotational movement to the tube, said toothed end portion of the ram being normally positioned closely adjacent one end of the receptacle, a pair of embossing rolls adapted to form a spline longitudinally of the tube and positioned in alignment with the other end of said receptacle, means for rotating the ram 180° and adapted for simultaneously advancing the ram axially into engagement with the keyway end of the tube for rotating the ram and tube in accordance with the aforesaid 90° position prior to the time that the tube is forced between the rolls and for thereafter advancing the tube through the rolls, and means associated with the ram for maintaining the ram in said position of rotation while the same is axially advancing the tube through the rolls for embossing a spline thereon whereby said spline is positioned on the tube at 90° from the keyway.

2. A machine adapted for producing a longitudinal spline on a tube wherein said spline is positioned a predetermined radial angle from an index point on said tube adjacent one end thereof, comprising in combination; a receptacle adapted to receive a tube having an index point thereon, a rotatable and longitudinally movable ram including means normally spaced closely adjacent one end of said receptacle adapted to engage said index point on said tube for imparting rotational movement thereto while on said receptacle, an embossing die adapted to form a spline longitudinally of the tube in a predetermined radial position with respect to said index point, said die being positioned in alignment with the other end of said receptacle a support through which said ram passes, a stationary pin in said support adapted to ride in a slot in the surface of said ram whereby the ram is rotated as it is moved longitudinally, actuating means coacting with said pin and slot for causing rotation of the ram and adapted for simultaneously advancing the ram axially into engagement with said index point end of the tube for rotating the ram and tube in accordance with said index point position, prior to the time that the tube is forced through the die and for thereafter advancing the tube through the die, and means associated with the ram adapted for maintaining the ram in said position of rotation while the same is axially advancing the tube through the die for embossing the spline thereon whereby said spline is positioned on the tube in a predetermined position with respect to said index point.

3. A machine adapted for producing a longitudinal spline on a tube wherein said spline is positioned a predetermined radial angle from an index point on said tube adjacent one end thereof, comprising in combination; a receptacle adapted to receive a tube having an index point thereon, a rotatable and longitudinally movable ram including means normally spaced closely adjacent one end of said receptacle adapted to engage said index point on said tube for imparting rotational movement thereto while on said receptacle, and an embossing die adapted to form a spline longitudinally of the tube in a predetermined radial position with respect to said index point, said die being positioned in alignment with the other end of said receptacle a support through which said ram passes, a stationary pin in said support adapted to ride in a slot in the surface of said ram whereby the ram is rotated as it is moved longitudinally, actuating means coacting with said pin and slot for causing rotation of the ram and adapted for simultaneously advancing the ram axially into engagement with said index point end of the tube and for rotating the tube in accordance with said index point position prior to the time that the tube is forced through the die and for thereafter advancing the tube through the die, means associated with the ram adapted for maintaining the ram in said position of rotation while the same is axially advancing the tube through the die for embossing the spline thereon whereby said spline is positioned on the tube in a predetermined position with respect to said index point, and external controls and circuits operatively connected to said actuating means for controlling the operation of said actuating means, said actuating means being rendered operative only when a tube is in position upon said receptacle.

4. The apparatus as claimed in claim 1, wherein the toothed end portion in the ram is mounted for yieldable longitudinal movement therein for facilitating proper engagement with said keyway.

References Cited in the file of this patent

UNITED STATES PATENTS

| | | |
|---|---|---|
| 469,623 | Shippee | May 2, 1893 |
| 499,677 | Daelen | June 13, 1893 |
| 1,881,533 | Hardiman | Oct. 11, 1932 |

FOREIGN PATENTS

| | | |
|---|---|---|
| 157,923 | Great Britain | Apr. 10, 1922 |